(12) United States Patent
Van Gompel et al.

(10) Patent No.: US 9,458,869 B2
(45) Date of Patent: Oct. 4, 2016

(54) FASTENING ELEMENT FOR CLAMPING SHEETS

(75) Inventors: Waltherus Emericus Johannes Van Gompel, Eersel (NL); Niels De Koning, Nijmegen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 260 days.

(21) Appl. No.: 14/115,405

(22) PCT Filed: May 10, 2012

(86) PCT No.: PCT/IB2012/052322
§ 371 (c)(1),
(2), (4) Date: Nov. 4, 2013

(87) PCT Pub. No.: WO2012/156870
PCT Pub. Date: Nov. 22, 2012

(65) Prior Publication Data
US 2014/0064846 A1  Mar. 6, 2014

(30) Foreign Application Priority Data
May 13, 2011  (EP) ..................... 11165963

(51) Int. Cl.
*F16B 5/06* (2006.01)
*F16B 5/00* (2006.01)
(Continued)

(52) U.S. Cl.
CPC ............ *F16B 5/0642* (2013.01); *F16B 2/245* (2013.01); *F16B 5/004* (2013.01); *F16B 5/0635* (2013.01); *F16B 5/121* (2013.01); *F16B 5/123* (2013.01); *F21V 5/007* (2013.01); *F21V 17/164* (2013.01); *F21V 3/02* (2013.01); *F21V 17/12* (2013.01); *F21V 23/06* (2013.01); *F21Y 2101/02* (2013.01);
(Continued)

(58) Field of Classification Search
CPC ...... F16B 5/06; F16B 5/0635; F16B 5/0642; F16B 5/121; F16B 5/123; F16B 5/125; F16B 2/20; F16B 2/245; F16B 2/246; F21V 17/16; F21V 17/164
See application file for complete search history.

(56) References Cited

U.S. PATENT DOCUMENTS 3,020,988 A * 2/1962 Bransford, Jr. ...... E04F 13/0848
24/563
3,024,509 A * 3/1962 Hamann .................. F16B 5/06
24/453
(Continued)

FOREIGN PATENT DOCUMENTS

DE      19852990 A1 * 5/2000 ............. B60N 3/023
DE       1650364 A1 * 4/2006 ............... E03C 1/33
(Continued)

*Primary Examiner* — Jonathan Masinick

(57) ABSTRACT

A fastening element (100) for clamping together a stack of sheets (410), (411) comprising at least two sheets. The fastening element comprises at least one base portion (101) extending along the stack of sheets and perpendicular to the planes of the sheets. Further, the fastening element comprises a flange portion (102) which extends substantially perpendicular from the base portion, and a pointed element (103) which extends in an acute angle with respect to the base portion. The flexible fastening element generates a spring force which clamps the sheets of the stack of sheets together between the at least one flange portion and the at least one pointed element. In this grip position, the at least one pointed element grips at least one edge of a bottom sheet of the stack of sheets, and a top sheet of the stack of sheets is allowed to move in relation to the at least one flange portion.

17 Claims, 7 Drawing Sheets

(51) Int. Cl.
*F16B 5/12* (2006.01)
*F21V 5/00* (2015.01)
*F21V 17/16* (2006.01)
*F16B 2/24* (2006.01)
*F21V 17/12* (2006.01)
*F21Y 101/02* (2006.01)
*F21Y 105/00* (2016.01)
*F21V 3/02* (2006.01)
*F21V 23/06* (2006.01)

(52) U.S. Cl.
CPC ......... *F21Y 2105/001* (2013.01); *Y10T 403/76* (2015.01)

(56) References Cited

U.S. PATENT DOCUMENTS 3,869,760 A * 3/1975 Meyer ..................... F16B 2/245
24/562

| | | | | |
|---|---|---|---|---|
| 2007/0057130 A1* | 3/2007 | Nikayin | ................ | H02G 3/126 248/216.1 |
| 2007/0280804 A1* | 12/2007 | Selle | ..................... | F16B 5/0642 411/520 |
| 2008/0217479 A1* | 9/2008 | Wood | ....................... | B60J 1/006 244/129.3 |
| 2010/0110679 A1* | 5/2010 | Teng | ........................ | F21K 9/00 362/235 |
| 2010/0284761 A1* | 11/2010 | Kato | .................. | F16B 19/1081 411/54.1 |

FOREIGN PATENT DOCUMENTS

| | | | | |
|---|---|---|---|---|
| DE | 1650365 A1 * | 4/2006 | ............... | E03C 1/33 |
| DE | 202009005203 U1 | 3/2010 | | |
| FR | 1186753 A * | 9/1959 | ............. | A47B 95/04 |
| FR | WO 2010052418 A1 * | 5/2010 | ......... | B60R 13/0206 |
| GB | 884939 A * | 12/1961 | ................ | F16B 5/06 |
| GB | 1590246 A | 5/1981 | | |
| JP | WO 2013150741 A1 * | 10/2013 | ........... | F16B 21/075 |
| WO | 2010032169 A1 | 3/2010 | | |

\* cited by examiner

FASTENING ELEMENT FOR CLAMPING SHEETS

FIELD OF THE INVENTION

The present invention relates to a fastening element for clamping together a stack of sheets.

BACKGROUND OF THE INVENTION

The use of light-emitting diodes (LEDs) is employed for a variety of illumination applications. As LEDs have the advantages of providing a bright light, being reasonably inexpensive, and drawing very little power, LED lighting is continuously increasing as an alternative to traditional incandescent lighting. Furthermore, LEDs have a long operational life. As an example, white LED lamps may last 100,000 hours, which is approximately 20 times the operational life of an incandescent bulb.

However, in order to maintain a long service life and/or avoid damage of a lighting arrangement comprising LEDs, it is advisable that the construction of the lighting arrangement withstands mechanical stress due to the influence of temperature on the materials used in the lighting arrangement, such as e.g. high/low temperatures and/or temperature fluctuations. The temperature conditions may arise externally, e.g. from the lighting arrangement environment, and/or internally, e.g. from fluctuations in heat produced by the LEDs of the lighting arrangement during operation.

In patent document WO2010/032169, a light-emitting arrangement is disclosed, comprising a LED, a printed circuit board (PCB) having a electrically/thermally conductive portion, and a heat release member for dissipating heat generated by the LED during operation. During operation, the heat is transferred from the LED via the conductive portion of the PCB to the heat release member. More specifically, the LED is provided on a LED chip which in turn is arranged on a substrate, wherein an electric/thermal connection between the substrate and the conductive portion of the PCB is provided by electric contacts and/or thermally conductive glue. Hence, heat from the LED may be transferred along a heat transfer path to the heat release member, wherein a portion of the heat transfer path, from the LED to the PCB, comprises electric contacts and/or thermally conductive glue.

However, alternative solutions for an adaptation to temperature effects may be of interest.

SUMMARY OF THE INVENTION

It is an object of the present invention to provide a device which reliably adapts to temperature effects on materials.

This and other objects are achieved by providing a fastening element having the features defined in the independent claim. Preferred embodiments are defined in the dependent claims.

Hence, according to the present invention, there is provided a fastening element for clamping together a stack of sheets comprising at least two sheets. The fastening element comprises at least one base portion for, when in use, extending along at least a portion of at least one edge of the stack of sheets and perpendicular to the planes of the sheets. Further, the fastening element comprises at least one flange portion which extends substantially perpendicular from the base portion, and at least one pointed element which extends in an acute angle with respect to the base portion. The fastening element is flexible and, when in use in a grip position, the fastening element generates a spring force which clamps the sheets of the stack of sheets together between the at least one flange portion and the at least one pointed element. In this grip position, the at least one pointed element grips at least one edge of a bottom sheet of the stack of sheets, and a top sheet of the stack of sheets is allowed to move in relation to the at least one flange portion.

Thus, the present invention is based on the idea of providing a fastening element(s) which flexibly clamps/presses/squeezes together a stack of sheets by a compressing force. Due to the flexibility of the fastening element, it allows a top sheet of the stack of sheets to move in relation to the flange portion, such that the fastening element adapts to any movement of the top sheet due to e.g. thermal expansion/contraction. In other words, the fastening element adapts to thermal properties of the sheets and/or to possible differences in thermal expansion between e.g. a top sheet and a bottom sheet, as the top sheet is able to move freely under the spring features of the fastening element. The present invention thereby mitigates detrimental temperature-dependent effects on the sheet material, such as e.g. cracking of one or several sheets due to thermal stress.

Another advantage of the present invention is that the fastening element of the present invention generates a pre-defined compressive force when clamping the sheets, which further mitigates the occurrence of stress-cracking. This is highly beneficial, as the pre-defined compressive force from the fastening element may be adapted to properties of the sheets such as material thickness, thermal expansion, hardness and/or strength. Hence, the clamping of the sheets is adapted according to the material/thermal conditions of the sheets.

Another advantage of the present invention is that the fastening element provides a strong/robust clamping of the sheets. Hence, in the grip position of the fastening element, the clamping of the sheets does not require any additional fastening means which are common in mounting techniques in the prior art, such as e.g. glue, screws, etc. Consequently, the present invention is cost effective, as additional means for attaching/fastening the sheets to each other may be omitted. Furthermore, since the fastening element according to various embodiments of the present invention can be used instead of other fastening means such as e.g. glue, screws, etc, the present invention provides an easier mounting when clamping the stack of sheets and/or when recycling the stack of sheets.

Moreover, the present invention provides a more reliable clamping of the stack of sheets compared to glue, which may negatively influence the positioning between the sheets (especially if exposed to large variations in temperature), and/or screws, which may damage the sheets during mounting.

Another advantage of the present invention is that the fastening element of the present invention in its construction is very easy to mount to the stack of sheets. The uncomplicated and intuitive application of the fastening element to the stack of sheets increases the mounting efficiency, thereby avoiding any troublesome, awkward and/or costly mounting.

Furthermore, as the fastening element, when in use, provides a clamping between the flange portion and the pointed elements, gripping the edge of the bottom sheet of the stack of sheets, the fastening element allows a direct heat transfer path/thermal path from the back/bottom side of the bottom sheet, e.g. to a heat sinking element. For example, if the bottom sheet is a heat-generating device such as a LED carrier, the heat generated from the carrier during operation may be efficiently transferred to an underlying heat sink by a direct thermal contact between the carrier and the heat sink. As a result, the fastening element of the present invention achieves a lower working temperature for the carrier during operation, and thus, a better performance.

By the term "fastening element", it is here meant a clip, a spring clip, clamp, a holding element, or the like.

By the term "sheet", it is here meant a relatively flat sheet/plate, which may be passive (e.g. a sheet with optical properties such as a lens/window or a sheet of solid material such as a plastic/metal plate) or active (e.g. a circuit board comprising electronics such as LEDs). Furthermore, by the term "pointed element", it is meant a tapered element, such as a tip, spike, or the like.

According to an embodiment of the present invention, the pointed elements may extend towards the flange portion. In this embodiment, the fastening element, when in use, provides the clamping of the stack of sheets in a gap between the pointed elements and the flange portion. In other words, the clamping force is provided in a plane/direction from the pointed elements to the flange portion. An advantage of the present embodiment is that this construction further improves the reliability of the clamping, as the fastening element thereby mitigates shear stresses in the sheets arising from the fastening element, and/or mitigates a clamping instability.

According to an embodiment of the present invention, the flange portion may be provided at a first end of the base portion and the pointed element is provided at a second end of the base portion, wherein the first end is provided opposite the second end. An advantage of the present embodiment is that a relatively small fastening element may be used for clamping a relatively large stack of sheets.

According to an embodiment of the present invention, the flange portion may have a tip pointing in a direction substantially parallel with the base portion, wherein the pointed elements point towards the tip. In this embodiment, the fastening element may have a gull-wing shape, wherein the tip of the gull-wing shape provides a beneficial contact line between the flange portion and the top sheet, in terms of a grip on the top sheet. Furthermore, a well-defined sliding portion of the fastening element on the top sheet is hereby provided.

According to an embodiment of the present invention, the fastening element may be made of sheet metal. An advantage of the present embodiment is that the fastening element made of sheet metal is flexible yet providing a relatively high spring force, such that the fastening element provides a suitable clamping of the stack of sheets. Furthermore, a fastening element made of sheet metal is relatively cheap and/or easy to produce.

According to an embodiment of the present invention, the pointed elements may be triangular-shaped. An advantage of the present embodiment is that the vertices of the triangular pointed elements provide a firm grip of the bottom sheet in the grip position when the fastening element is in use, wherein the vertices penetrate or about the material of the bottom sheet when clamping the stack of sheets.

According to an embodiment of the present invention, the fastening element may further comprise a center portion, wherein the at least one base portion extends substantially perpendicular from the center portion. The fastening element further comprises at least one auxiliary flange, which is arranged to release the pointed elements from the edge of a bottom sheet of the stack of sheets when a force is applied to the fastening element in a direction from the top sheet towards the bottom sheet. By this, the fastening element moves from the grip position to a locking position. In this locking position, the center portion may be fastened to a housing. Further, the fastening element generates a spring force which clamps together the sheets of the stack of sheets between the flange portion and the center portion, and a top sheet of the stack of sheets is allowed to move in relation to the flange portion. In other words, the auxiliary flange provides a release of the pointed elements, such that the clamping in the locking position is provided between the flange portion and the center portion. An advantage of the present embodiment is that an even more improved thermal contact can be provided between the bottom sheet and the underlying housing or other heat-dissipating structure, such as a heat sink. This is explained by means of the following observation: in the grip position, the force between the flange portion and the pointed elements may somewhat neutralize the force between the bottom sheet and the housing. Hence, if the center portion is fastened to the housing, i.e. that the stack of sheets is fastened to the housing, the pointed elements may be released from the bottom sheet for providing an improved thermal path between the bottom sheet and the housing.

By the term "housing", it is here meant a casing, plate, element or the like, which may have heat-sinking properties.

According to an embodiment of the present invention, the auxiliary flange may extend, from the center portion, beyond the pointed elements in a direction parallel with the plane of the center portion. By this, the pointed elements are released from the edge of the bottom sheet of the stack of sheets when a force is applied to the fastening element in a direction from the top sheet towards the bottom sheet. An advantage of the present embodiment is that the auxiliary flange thereby readily "pushes" the pointed elements away from the connection/fastening to the bottom sheet.

According to an embodiment of the present invention, the auxiliary flange may provide a rotational axis of the fastening element in a direction perpendicular to a normal of the center portion and perpendicular to the direction of the pointed elements. By this, the pointed elements are released from the at least one edge of a bottom sheet of the stack of sheets upon rotation of the fastening element, when a force is applied to the fastening element in a direction from the top sheet towards the bottom sheet. In other words, in this embodiment, the auxiliary flange may act as a pivot point, e.g. between the center portion and the pointed elements. If a force is applied to the center portion, the auxiliary flange is arranged to allow the pointed elements to rotate away from the connection/fastening to the bottom sheet.

According to an embodiment of the present invention, the pointed elements may extend in a direction substantially perpendicular with the flange portion. This embodiment provides for a decoupling of the flange portion and the pointed elements in terms of direction. For example, if the fastening element comprises a rectangular center portion, flange portions may extend from base portions from two opposite sides, and the pointed elements may extend from the two other opposite sides of the center portion.

According to an embodiment of the present invention, the center portion may be substantially rectangular and the fastening element may comprise at least two base portions arranged on opposite sides of the center portion. If two base portions are provided, the fastening element in this embodiment resembles a seat, providing a stable, easily applied and reliable fastening element. Alternatively, the fastening element may comprise four base portions arranged on each side of the four sides of the rectangular center portion, which even further improves the clamping effect of the fastening element.

According to an embodiment of the present invention, the center portion may further comprise a hole arranged for allowing a fixation of the fastening element to the housing. An advantage of the present embodiment is that the fastening element provides a hole for fastening/fixating/attaching the fastening element to the housing, e.g. in the locking position, wherein a screw or the like may be used as a fastening means.

The fastening element according to various embodiments of the present invention may, furthermore, advantageously be comprised in a light-emitting arrangement further comprising a carrier, at least one light-emitting diode, LED, for emitting light, a lens element, arranged for a refraction of the light emitted by the at least one LED, and a housing for the carrier, arranged for dissipating heat from the carrier generated by the at least one LED during operation. The fastening element clamps together the lens element and the carrier, wherein the lens element is able to move, e.g. due to thermal expansion, under the flange portion of the fastening element. This is beneficial for the light-emitting arrangement, as the fastening element thereby mitigates detrimental temperature-dependent effects such as e.g. cracking of the lens element due to thermal stress.

According to an embodiment of the present invention, the lens element and the carrier may comprise a cavity arranged for housing the fastening element. In this embodiment, the cavity is provided in a direction from the top sheet towards the bottom sheet. An advantage of the present embodiment is that the fastening element may be provided in a central part of the lens element/carrier, i.e. not only at the edges of the lens element/carrier. By this, an even more stable and reliable clamping of the lens element and the carrier may be provided.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION

In the following description, the present invention is described with reference to a fastening element for clamping together a stack of sheets.

Figure 1:
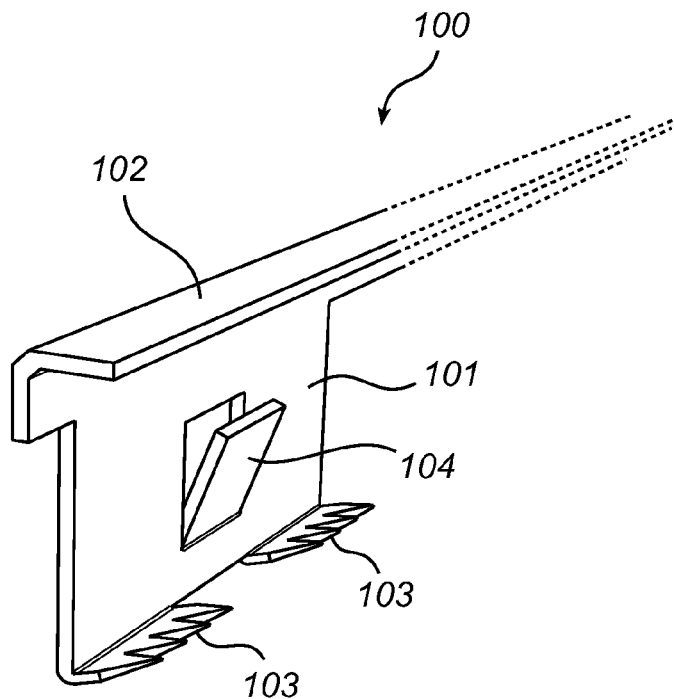
FIG. 1 is a schematic perspective view of a fastening element for clamping together a stack of sheets, in accordance with an embodiment of the present invention.

FIG. 1 is a schematic perspective view of a fastening element 100 for clamping together a stack of sheets, in accordance with an embodiment of the present invention. The fastening element 100 comprises a rectangular base portion 101 which is substantially flat and which may be made of metal sheet. A flange portion 102 extends substantially perpendicular from the base portion 101, wherein the flange portion 102 is provided at a first end of the base portion 101. Two sets with three triangular-shaped pointed elements 103 are provided, the pointed elements 103 extending in an acute angle with respect to the base portion 101 and pointing towards the flange portion 102. The pointed elements 103 are provided at a second end of the base portion 101, at the opposite end of the flange portion 102. A center flange 104, with much smaller dimensions than the base portion 101, is provided approximately in the middle of the base portion 101. The center flange 104 extends in an acute angle with respect to the base portion 101 and points towards the flange portion 102.

The fastening element 100, which may be made of metal sheet, is flexible. When the fastening element 100 is in use in a grip position, it generates a spring force which clamps the sheets of the stack of sheets (not shown) together between the flange portion 102 and the pointed elements 103. The pointed elements 103 grip an edge of a bottom sheet of the stack of sheets, and a top sheet of the stack of sheets is allowed to move in relation to the flange portion 102. The center flange 104 contributes to the spring force of the fastening element 100.

Figure 2A:
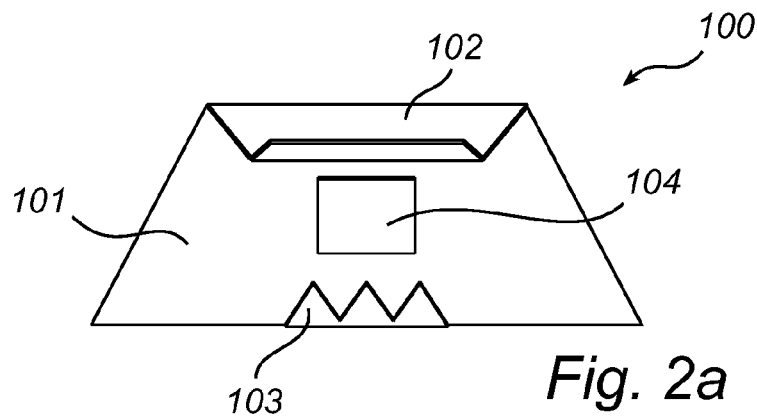
FIG. 2a-c is a schematic front view and schematic profile views, respectively, of a fastening element as shown in FIG. 1, in accordance with an embodiment of the present invention.
Figure 2B:
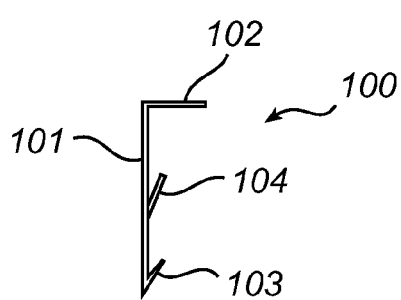
Figure 2C:
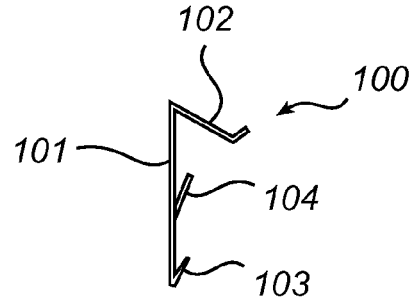

FIG. 2a-c is a schematic side view and schematic profile views, respectively, of a fastening element 100 as shown in FIG. 1, in accordance with an embodiment of the present invention. In FIG. 2a, the flange portion 102 is provided with a tip pointing in a direction substantially parallel with the base portion 101, and the pointed elements 103 point towards the tip. In FIG. 2b, the flange portion 102 extends perpendicular from the base portion 101, wherein the pointed elements 103 and the center flange 104 point towards the end tip of the flange portion 102. In FIG. 2c, the flange portion 102 has a "gull-wing" shape comprising a first portion which is inclined downwards and a second portion, shorter that the first portion, which is inclined upwards. Here, the pointed elements 103 point towards the downward pointing tip of the "gull-wing" shape of the flange portion 102.

Figure 3A:
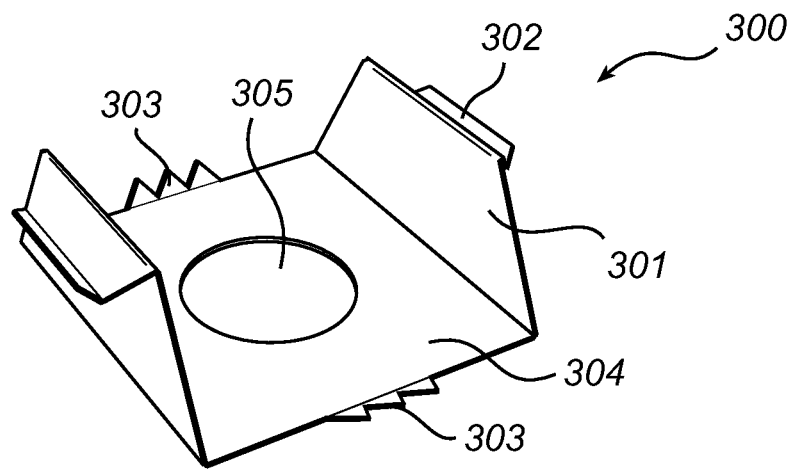
FIG. 3a-e are perspective views of fastening elements comprising two base portions, in accordance with an embodiment of the present invention.

FIG. 3a-e are perspective views of fastening elements 300 comprising two base portions 301 and a center portion 304 in accordance with embodiments of the present invention. In FIG. 3a, two base portions 301 extend substantially perpendicular, and from opposite sides, from a substantially quadratic center portion 304. Flange portions 302 extend from each base portion 301 in opposite directions, and each flange 302 has a "gull-wing" shape as previously described.

Figure 3B:
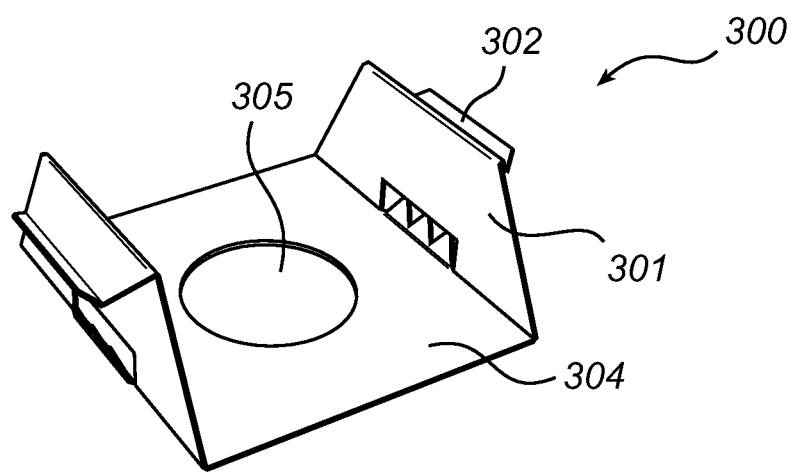

The pointed elements 303 extend in an acute angle with respect to the base portion 301. Further, in FIG. 3a, the pointed elements 303 extend in a direction substantially perpendicular to the extending direction of the flange portions 302. The pointed elements extend from the two opposite sides of the center portion 304 from which the two base portions 301 do not extend. In other words, from the four sides of the center portion 304, the base portions 301 extend from two opposite sides, and the pointed elements 303 extend from the two other opposite sides of the center portion 304. In FIG. 3b, on the other hand, the pointed elements 303 extend from the same sides of the center portion 304 from which the two base portions 301 extend. A hole 305 is arranged in the center portion 304 for allowing a fixation of the fastening element 300 to a housing (not shown).

Figure 3C:
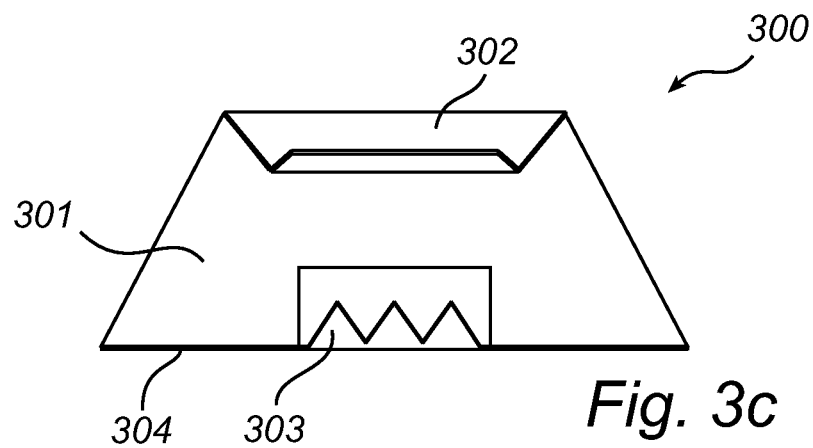
Figure 3D:
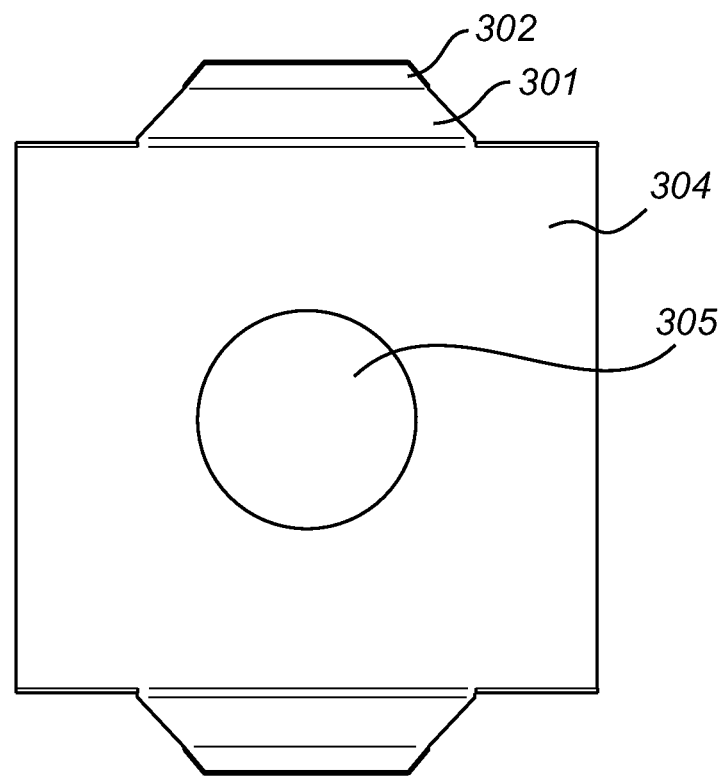

FIG. 3c shows a side view of the fastening element 300, in a direction of the plane of the center portion 304. In FIG. 3d, a top view of the fastening element 300 is shown.

Figure 3E:
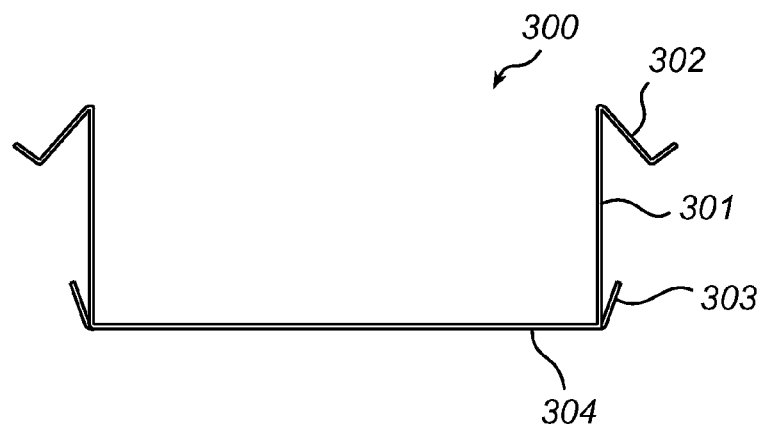

FIG. 3e shows a profile view of the fastening element 300, wherein the pointed elements 303 extend from the same sides of the center portion 304 from which the two base portions 301 extend. Analogously with the described function of the fastening element 100 shown in FIG. 1, the fastening element 300, when in use in a grip position, generates a spring force on both sides of the fastening element 300 comprising the base portion 301, the flange portion 302 and the pointed elements 303, wherein a top sheet of a stack of sheets (not shown) is allowed to move in relation to the flange portion 302.

Figures 4A, 4B:
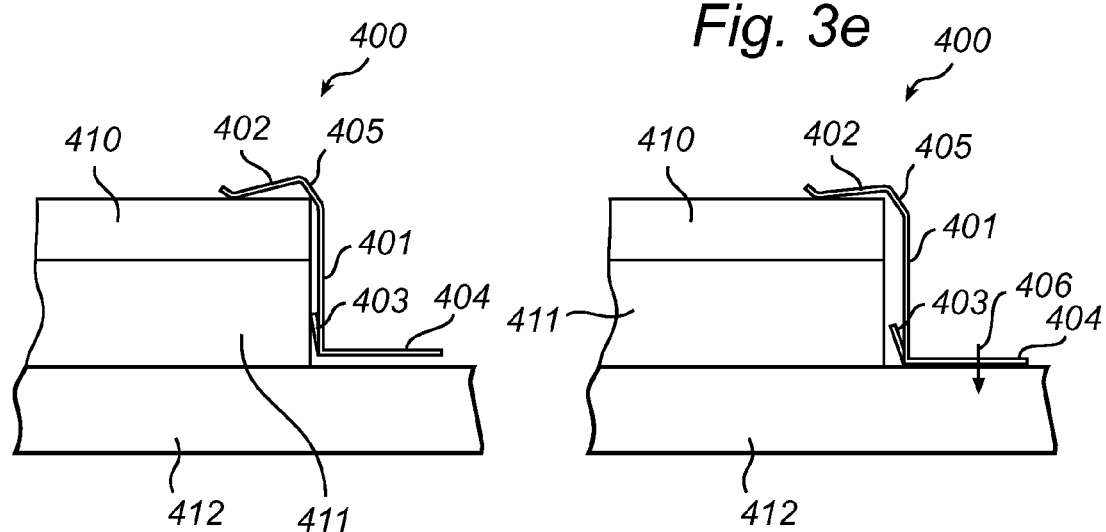
FIG. 4a-d are profile views of a fastening element comprising an auxiliary flange, in accordance with an embodiment of the present invention.

FIG. 4a-e are profile views of a fastening element 400 comprising an auxiliary flange 405/407, in accordance with an embodiment of the present invention. In FIG. 4a, the fastening element 400 is in a grip position, generating a spring force which clamps together the sheets 410, 411 of the stack of sheets between the flange portion 402 and the pointed elements 403, wherein the pointed elements 403 grip an edge of a bottom sheet 411 of the stack of sheets. In the two-dimensional view of FIG. 4a, the auxiliary flange 405 extends away from the center portion 404 and beyond the pointed elements 403 in a direction parallel with the plane of the center portion 404. Here, the direction of the auxiliary flange 405 is provided substantially in parallel with the pointed elements 403. Alternatively, the auxiliary flange 405 may be provided substantially perpendicular with the pointed elements 403.

If a force is applied to the fastening element 400 in a direction from the top sheet 410 towards the bottom sheet 411, the fastening element 400 may be moved from the grip position to a locking position, which is shown in FIG. 4b. If the fastening element 400 is moved from the grip position to the locking position, the auxiliary flange 405 is arranged to release the pointed elements 403 from the edge of the bottom sheet 411 of the stack of sheets. In other words, when pushing the fastening element 400 downwards, as seen in FIGS. 4a-b, the auxiliary flange 405 slides on the edge of the top sheet 410, thereby pushing the pointed elements 403 from the edge of the bottom sheet 411 of the stack of sheets. In FIG. 4b, the center portion 404 is fastened 406 to a housing 412, such that the fastening element 400 generates a spring force which clamps the sheets 410, 411 of the stack of sheets together between the flange portion 402 and the center portion 404, and wherein the top sheet 410 of the stack of sheets is allowed to move in relation to the flange portion 402.

Figures 4C, 4D:
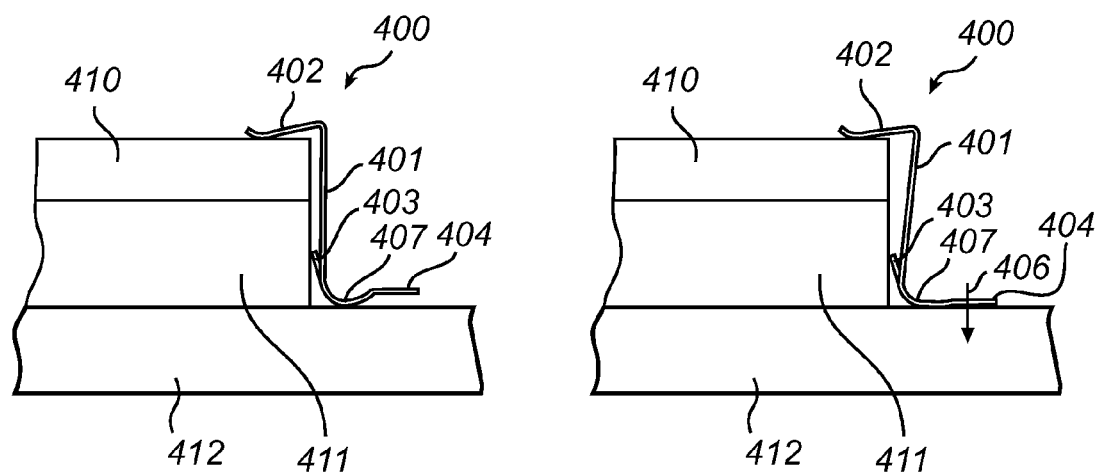

In FIG. 4c, the fastening element 400 is shown in a grip position analogously with FIG. 4a. Here, the auxiliary flange 407 is shown as a portion of a circle, thereby providing a rotational axis of the fastening element 400 in a direction perpendicular to a normal of the center portion 404 and perpendicular to the direction the pointed elements 403. For the left hand side portion of the fastening element 400, as shown in FIG. 4c, this means a clockwise rotation of the fastening element 400. By this, the pointed elements 403 are released from the edge of the bottom sheet 411 of the stack of sheets upon rotation of the fastening element 400, when a force is applied to the fastening element 400 in a direction from the top sheet 410 towards the bottom sheet 411. By this, the fastening element 400 is moved to a locking position, which is shown in FIG. 4d. In this locking position, the center portion 404 is fastened 406 to a housing 412, such that the fastening element 400 generates a spring force which clamps the sheets 410, 411 of the stack of sheets together between the flange portion 402 and the center portion 404, and wherein the top sheet 410 of the stack of sheets is allowed to move in relation to the flange portion 402.

Figure 5:
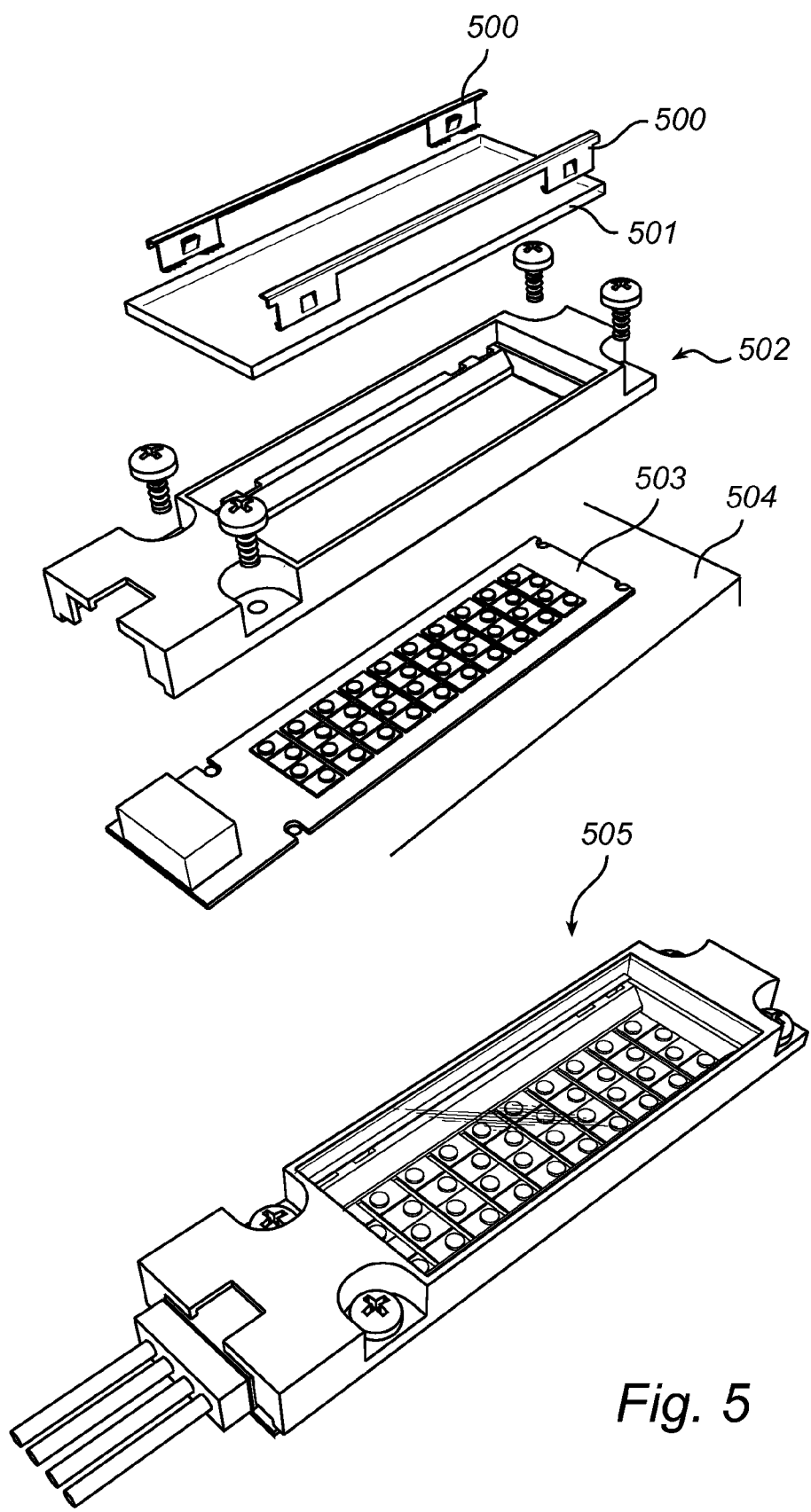
FIG. 5 is an exploded view of a light-emitting arrangement, comprising a fastening element for clamping a lens element to a carrier within a cover, in accordance with an embodiment of the present invention.

FIG. 5 is an exploded view of a light-emitting arrangement 505, comprising a fastening element 500 for clamping a lens element 501 to a carrier 503 within a cover 502, in accordance with an embodiment of the present invention. The carrier 503 comprises a plurality of light-emitting diodes, LEDs, for emitting light, and the lens element 501, arranged over the carrier 503, is arranged for a refraction of the light emitted by the LEDs. The cover 502 encloses the sides of the fastening element 500, the lens element 501 and the carrier 503. The cover 502 may be fastened to a housing 504 by screws, wherein the housing 504 is arranged for dissipating heat from the carrier which is generated by the LEDs of the carrier 503 during operation.

Figure 6:
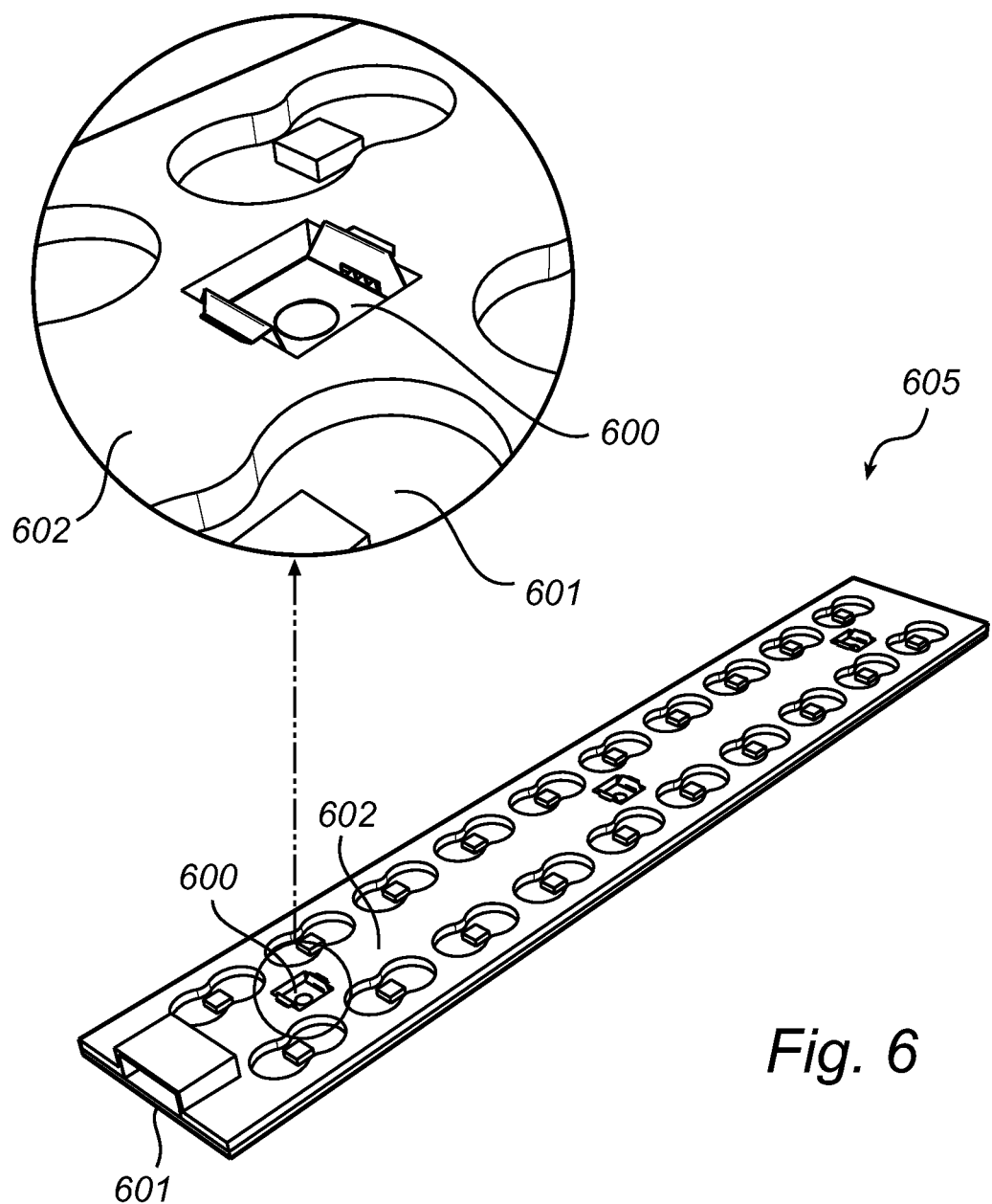
FIG. 6 is a perspective view of a light-emitting arrangement, comprising a lens element, a carrier, and a fastening element, in accordance with an embodiment of the present invention.

FIG. 6 is a perspective view of a light-emitting arrangement 605, comprising a lens element 602, a carrier 601, and a fastening element 600, in accordance with an embodiment of the present invention. The lens element 602 and the carrier 601 comprise a cavity arranged for housing the fastening element 400.

Figures 7A, 7B:
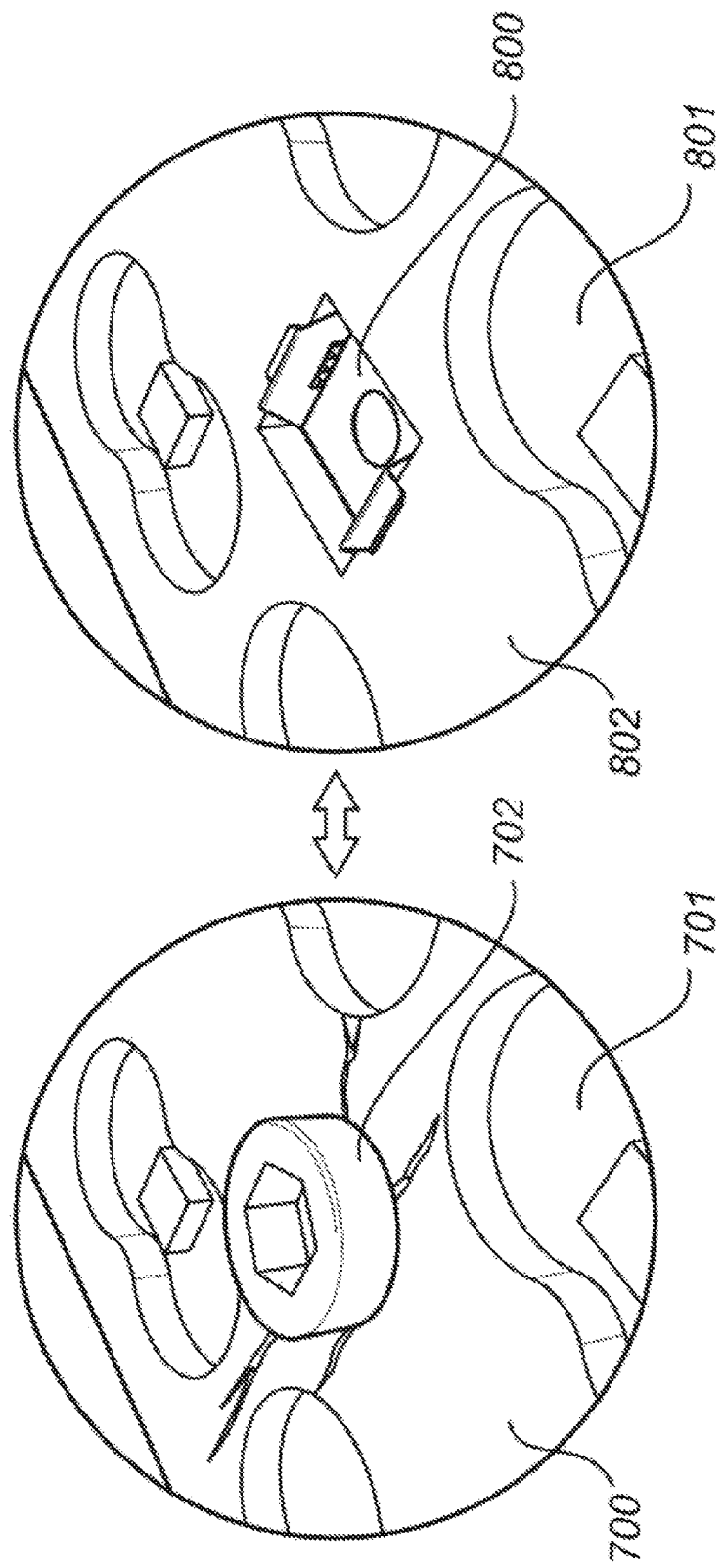
FIG. 7a-b is a schematic illustration of an lens element connected by a screw to a LED device, in accordance with prior art, and a schematic illustration of an lens element, a carrier, and a fastening element, in accordance with an embodiment of the present invention.

FIG. 7a is a schematic illustration of a lens element 700 connected by a screw 702 to a LED device 701 in accordance with prior art. The figure shows four LEDs which are arranged on the LED device 701 in a 2×2 matrix, wherein the screw 702 is attached through the lens element 700 to the LED device 701 approximately between the four LEDs. In a temperature cycle test, the prior art arrangement of FIG. 7a was exposed to large variations in temperature between −40° C. and 85° C. After 30 cycles, the arrangement disclosed cracks in the lens element 700. The flexible solution of the present invention, as showed by the fastening element 800 in FIG. 7b for clamping together the lens element 801 with the carrier 802, takes away stresses, due to the spring force of the fastening element 800, adapting to thermal conditions. By this, the fastening element 800 of the present invention allows for thermal expansion of the lens element 801 and the carrier 802, still steadily and reliably clamping together the lens element 801 and the carrier 802.

Even though the invention has been described with reference to specific exemplifying embodiments thereof, many different alterations, modifications and the like will become apparent for those skilled in the art. The described embodiments are therefore not intended to limit the scope of the invention, as defined by the appended claims. For example, any dimension of the fastening element may be different from those shown in FIGS. 1-7, i.e. the base portion, flange portion, center portion and/or pointed elements may be larger, smaller, thicker, thinner, etc. Moreover, the auxiliary flanges 405 and 407 may be provided in other shapes and/or positions with respect to the fastening element 400 for the purposes of releasing the pointed elements 403 from the bottom sheet 411. For example, the auxiliary flanges 405 and 407 may be arranged perpendicular to the elongation of the flanges 405 and 407 as shown in FIGS. 4a-d, i.e. turned 90°.

The invention claimed is:

1. A light-emitting arrangement comprising:
a stack of sheets comprising at least two sheets;
a fastening element comprising:
at least one base portion extending along at least a portion of at least one edge of said stack of sheets and perpendicular to planes of said sheets,
at least one flange portion extending substantially perpendicular from said base portion, and
at least one pointed element extending in an acute angle with respect to said base portion, and
a center portion, wherein said at least one base portion extends substantially perpendicular from a plane of said center portion, said center portion being configured to fix said fastening element to a housing,
wherein said fastening element is flexible and, clamps together with a spring force the sheets of said stack of sheets between said at least one flange portion and said at least one pointed element,
wherein said at least one pointed element grips at least one edge of a bottom sheet of said stack of sheets,
wherein a top sheet of said stack of sheets is capable of moving in relation to said at least one flange portion, and
wherein, in response to a force applied to the center portion of the fastening element along a direction from the top sheet to the bottom sheet to fix said fastening element to the housing, said at least one pointed element is released from said at least one edge of said bottom sheet of said stack of sheets.

2. The light-emitting arrangement as claimed in claim 1, wherein said at least one pointed element extends towards said at least one flange portion.

3. The light-emitting arrangement as claimed in claim 1, wherein said at least one flange portion is provided at a first end of said at least one base portion and said at least one pointed element is provided at a second end of said at least one base portion; said first end being provided opposite said second end.

4. The light-emitting arrangement as claimed in claim 3, wherein said at least one flange portion has a tip pointing in a direction substantially parallel with said base portion, and wherein said at least one pointed element points towards said tip.

5. The light-emitting arrangement as claimed in claim 4, wherein said fastening element is made of metal sheet.

6. The light-emitting arrangement as claimed in claim 5, wherein said at least one pointed element is triangular-shaped.

7. The light-emitting arrangement as claimed in claim 6, wherein the fastening element further comprises:
at least one auxiliary flange, arranged to release said at least one pointed element from said at least one edge of a bottom sheet of said stack of sheets to thereby move said fastening element from said grip position to a locking position when said center portion is fastened to the housing, said fastening element thereby generating a spring force which clamps together the sheets of said stack of sheets between said at least one flange portion and said center portion while allowing a top sheet of said stack of sheets to move in relation to said at least one flange portion.

8. The light-emitting arrangement as claimed in claim 7, wherein said auxiliary flange, from said center portion, extends beyond the at least one pointed element in a direction parallel with the plane of said center portion.

9. The light-emitting arrangement as claimed in claim 7, wherein said auxiliary flange provides a rotational axis of said fastening element in a direction perpendicular to a normal of said center portion and perpendicular to the direction of said at least one pointed element.

10. The light-emitting arrangement as claimed in claim 9, wherein said at least one pointed element extends in a direction substantially perpendicular with said flange portion.

11. The light-emitting arrangement as claimed in claim 10, wherein said center portion is substantially rectangular and said fastening element comprises at least two base portions arranged on opposite sides of said center portion.

12. The light-emitting arrangement as claimed in claim 11, wherein said center portion further comprises a hole arranged for allowing a fixation of said fastening element to said housing.

13. The light-emitting arrangement of claim 1, wherein a first one of the stack of sheets comprises a carrier, comprising at least one light-emitting diode, LED, for emitting light, and a second one of the stack of sheets comprises a lens element, arranged for refracting the light emitted by said at least one LED, and
wherein the fastening element is configured to clamp together said lens element and said carrier.

14. The light-emitting arrangement as claimed in claim 13, wherein said lens element and said carrier comprise at least one cavity arranged for housing said fastening element.

15. The light-emitting arrangement as claimed in claim 1, wherein said at least one pointed element comprises a plurality of points.

16. The light-emitting arrangement as claimed in claim 15, wherein said plurality of points form a jagged edge.

17. The light-emitting arrangement as claimed in claim 15, wherein said plurality of points extend in an acute angle with respect to said base portion and toward at least one flange portion.

* * * * *